(12) United States Patent
Yuan et al.

(10) Patent No.: US 12,524,883 B2
(45) Date of Patent: Jan. 13, 2026

(54) SYSTEMS AND METHODS FOR ASSESSING CELL GROWTH RATES

(71) Applicant: AMGEN INC., Thousand Oaks, CA (US)

(72) Inventors: Yu Yuan, Chicago, IL (US); Tony Y. Wang, Tiverton, RI (US); Kim H. Le, Thousand Oaks, CA (US); Christopher Tan, Los Angeles, CA (US); Jasmine Tat, Thousand Oaks, CA (US); Thorsten Dzidowski, Munich (DE)

(73) Assignee: AMGEN INC., Thousand Oaks, CA (US)

( * ) Notice: Subject to any disclaimer, the term of this patent is extended or adjusted under 35 U.S.C. 154(b) by 423 days.

(21) Appl. No.: 17/909,062

(22) PCT Filed: Mar. 4, 2021

(86) PCT No.: PCT/US2021/020771
§ 371 (c)(1),
(2) Date: Sep. 2, 2022

(87) PCT Pub. No.: WO2021/178605
PCT Pub. Date: Sep. 10, 2021

(65) Prior Publication Data
US 2023/0086042 A1 Mar. 23, 2023

Related U.S. Application Data (60) Provisional application No. 62/986,113, filed on Mar. 6, 2020.

(51) Int. Cl.
*G06T 7/00* (2017.01)
(52) U.S. Cl.
CPC .. *G06T 7/0016* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS

| 2014/0056504 A1 | 2/2014 | Lee et al. |
| 2019/0050667 A1* | 2/2019 | Wang ............... G06V 10/26 |

(Continued)

FOREIGN PATENT DOCUMENTS

| WO | WO-2016172532 A2 * | 10/2016 | ............ C12M 41/36 |
| WO | WO-2019171453 A1 | 9/2019 | |
| WO | WO-2020/0112723 A1 | 6/2020 | |

OTHER PUBLICATIONS

Fan, K., Zhang, S., Zhang, Y. et al. A Machine Learning Assisted, Label-free, Non-invasive Approach for Somatic Reprogramming in Induced Pluripotent Stem Cell Colony Formation Detection and Prediction. Sci Rep 7, 13496 (2017). https://doi.org/10.1038/s41598-017-13680-x.*

(Continued)

*Primary Examiner* — Andrew W Bee
*Assistant Examiner* — Christine Zhao
(74) *Attorney, Agent, or Firm* — MARSHALL, GERSTEIN & BORUN LLP (57) ABSTRACT

A method of facilitating a growth assessment for a cell line includes generating an image of a well that contains a medium that was inoculated with at least one cell of the cell line. The method also includes generating a down-sampled segmentation map comprising pixels that indicate an inferred presence or absence of a cell colony in corresponding portions of the well image. Generating the down-sampled segmentation map includes inputting the well image to a fully convolutional neural network having a plurality of convolutional layers. The method also includes (i) determining, by inputting colony size information (including the down-sampled segmentation map and/or a pixel (Continued)

count derived therefrom) to a cell growth assessment algorithm, a growth classification or score for the cell line, and causing a display of the growth classification or score, and/or (II) causing a display of the colony size information to facilitate a manual cell growth assessment.

19 Claims, 7 Drawing Sheets

(56) References Cited

U.S. PATENT DOCUMENTS

2019/0114770 A1* 4/2019 Song ............... G06V 10/454
2020/0258223 A1* 8/2020 Yip ..................... G06F 18/21

OTHER PUBLICATIONS

Xie, W., Noble, J. A., & Zisserman, A. (2016). Microscopy cell counting and detection with fully convolutional regression networks. Computer Methods in Biomechanics and Biomedical Engineering: Imaging & Visualization, 6(3), 283â292. https://doi.org/10.1080/21681163.2016.1149104.*

Solentim Cell Metric user guide. https://www.trio-biotech.com/wp-content/uploads/2016/09/Cell-Metric-User-Guide-2015-09-11.pdf (Year: 2015).*

Huangjing Lin, Hao Chen, Qi Dou, Liansheng Wang, Jing Qin, & Pheng-Ann Heng (2017). ScanNet: A Fast and Dense Scanning Framework for Metastastic Breast Cancer Detection from Whole-Slide Image. 2018 IEEE Winter Conference on Applications of Computer Vision (WACV), 539-546.*

Long, J., Shelhamer, E., & Darrell, T. (2015). Fully convolutional networks for semantic segmentation. In 2015 IEEE Conference on Computer Vision and Pattern Recognition (CVPR) (pp. 3431-3440).*

Search Report and Written Opinion in International Application No. PCT/US2021/020771 dated Jun. 7, 2021, 16 pages.

Fan et al., "A Machine Learning Assisted, Label-free, Non-invasive Approach for Somatic Reprogramming in Induced Pluripotent Stem Cell Colony Formation Detection and Prediction", Scientific Reports, vol. 7, No. 1, Oct. 18, 2017, 9 pages.

Rempfler et al., "Tracing Cell Lineages in Videos of Lens-free Microscopy", Medical Image Analysis, vol. 48, Jun. 5, 2018, pp. 147-161.

Long et al., "Fully Convolutional Networks for Semantic Segmentation", Proceedings of the IEEE Conference on Computer Vision and Pattern Recognition, vol. 39, No. 4, Oct. 15, 2015, pp. 3431-3440.

Xie et al., "Microscopy Cell Counting and Detection with Fully Convolutional Regression Networks", Computer Methods in Biomechanics and Biomedical Engineering: Imaging & Visualization, 2018, vol. 6, No. 3, pp. 283-292.

Japanese Patent Application No. 2022-552552, Office Action, mailed Jan. 14, 2025.

* cited by examiner

SYSTEMS AND METHODS FOR ASSESSING CELL GROWTH RATES

FIELD OF DISCLOSURE

The present application relates generally to clone selection techniques for cell line development, and more specifically to techniques for assessing the growth/proliferation rate associated with a particular clone.

BACKGROUND

As demand grows for better-performing cells, the throughput rate of the cel line development process becomes increasing critical. The process is complex, however, with every clone/cell line having characteristics that make it unique, and finding the "best" clone for a particular application can require sorting through hundreds or thousands of potential candidates. Clone selection is typically performed by assessing various characteristics that tend to indicate how suitable each clone will be for a commercial dug product. For example, it is desirable that a clone produce high quality proteins, and be resilient to environmental strains. Another significant characteristic is the growth profile of the clone, i.e., the growth/proliferation rate of the clone over a given time period. To assess the growth profile, individual cells of a cell line are typically inoculated into separate wells (e.g., in a 96-well plate) using a flow cytometry technique such as fluorescence-activated cel sorting (FACS) and then incubated for a suitable time period (e.g., 14 days). Throughout the incubation period, digital images of the wells are captured at suitable time intervals, such as every day, or every few days, etc. An expert analyst reviews the well images over time to assess the growth rate of the clone. This manual review/assessment is very time consuming and tedious, however, and generally requires many man-hours of analyzing microscopic images.

SUMMARY

Embodiments described herein relate to systems and methods that improve upon traditional visual inspection techniques for assessing the growth/proliferation rate of a clone used to inoculate one or more wells (e.g., in a 96-well plate), by automating at least a portion of the visual inspection process (e.g., for greater standardization and higher throughput) and, in particular, by mitigating various difficulties inherent to an automated visual inspection process (e.g., difficulties associated with counting cells dense cell colonies, and/or difficulties associated with generating training libraries, etc.). The automated techniques described herein may be used during the clone selection phase of cell line development, for example. As used herein, the term "well" refers to any laboratory-scale cell culture environment that permits optical inspection of its contents. While wells on multi-well plates are discussed by way of example herein, it will be appreciated that wherever a "well" and a "well plate" are mentioned, unless stated otherwise, these terms are contemplated to encompass any suitable laboratory-scale cell culture environment permitting optical inspection of its contents. The terms "clone" and "cel line" are used interchangeably herein.

More specifically, well images may be processed by a computer system to automate one or more steps that facilitate a manual growth assessment process by a user or, alternatively, to automate the entire growth assessment process. In some embodiments, a well image is captured at regular or irregular intervals (e.g., every day or two) after inoculation of the well, with at least some of the well images being processed by a convolutional neural network ("CNN"). For example, the CNN may be a novel, modified version of the fully convolutional network ("FCN") recently described by J. Long, E. Shelhamer and T. Darrell in *Fully Convolutional Networks for Semantic Segmentation*, Computer Vision and Pattern Recognition, 2015 ("Long et al."), the entirety of which is hereby incorporated herein by reference. In particular, in some of these embodiments, the FCN of Long et al. is modified by omitting any transpose (or "deconvolution") layers, such that the FCN outputs a "heatmap" that is not up-sampled and therefore smaller than the original well image. Thus, whereas the FCN of Long et al. outputs a full segmentation image having a size equal to the original input image, the FCN of the present disclosure outputs a smaller, down-sampled segmentation map. The pixels of the down-sampled segmentation map may indicate an inferred presence or absence of a cell colony in corresponding portions of the larger well image. The FCN may therefore effectively act as a filter that scans the well image to detect cell colonies, with the number of pixels (e.g., via a pixel count as described herein) representing cell colonies in the down-sampled segmentation map serving as an approximate indicator of colony size.

Relative the full-size segmented image output by the FCN of Long et al., the down-sampled segmentation map produced by the FCN of the present disclosure generally results in less precision on the segment boundaries (i.e., in this application, on the cell colony boundaries), and may also cause "stray" cels (i.e., cels that are displaced from the main mass of the colony) to be unaccounted for. While these may at first seem to be significant shortcomings of the technique, it has been found that relatively imprecise colony boundaries/areas, such as those provided by the down-sampled segmentation map, can be sufficient for making a reliable growth assessment, and that stray cells are typically few enough in number to be safely disregarded for purposes of cell growth assessment. Moreover, it has been found that approximate, relative cell colony sizes in well images (captured across multiple days) can be a reliable indicator for assessing growth, without requiring precise cell counts when a cell colony has grown relatively large. Further still, training the FCN of the present disclosure can be far less time-consuming and/or costly than training conventional FCN's such as the FCN described in Long et al. In particular, the architecture of the FCN of the present disclosure may be trained using smaller, cropped image "patches" instead of full well images, thus making it unnecessary to label every pixel of full well images when building a training library. This can greatly reduce the amount of time required to manually label images for the training library.

In some embodiments, different techniques are used to assess cell growth/proliferation at earlier stages of incubation. For example, a cell counting technique may be used for well images captured in the first few days after inoculation, before the colony has grown dense enough to obscure a large number of cels (e.g., due to "stacking" of cells in the colony). For example, the systems and methods disclosed herein may determine precise cell counts in one or more early-stage well images using a fully convolutional regression network (or "FCRN") as described by W. Xie, J. A. Noble and A. Zisserman in *Microscopy Cal Counting and Detection with Fully Convolutional Regression Networks*, Computer Methods in Biomechanics and Biomedical Engineering: Imaging & Visualization, 2018, Vol. 6, No. 3, pp. 283-292 ("Xie et al."), the entirety of which is hereby incorporated herein by reference.

Additionally or alternatively, in some embodiments, the systems and methods disclosed herein may determine whether a given cell colony (e.g., as represented in the down-sampled segmentation map) originated from a single cl and, if not, may display information indicating that the colony and/or well should be disregarded for growth assessment purposes. Various techniques that may be used to determine whether a colony originated from a single cell are described in PCT Patent Application No. PCT/US19/63177 (PCT Patent Publication No. WO 2020/0112723), entitized "Systems and Methods for Facilitating Clone Selection" and filed on Nov. 26, 2019, the entire disclosure of which is hereby incorporated herein by reference.

In some embodiments, the outputs of one or more of the steps or algorithms discussed above are analyzed by a user (e.g., a scientist or process engineer) to make a final assessment on the growth profile of a clone. Alternatively, in some embodiments, outputs of one or more of the steps or algorithms discussed above are automatically analyzed using a higher-level algorithm, which may generate an overall cell growth classification or score for the clone. For example, a cell growth assessment algorithm may operate on precise counts for one or more early-stage well images, and also operate on other indicators of colony size (e.g., the number of pixels classified as belonging to a colony in a down-scaled segmentation map) for one or more later-stage well images. The cell growth assessment algorithm may then output a growth score for the clone, or output a binary indicator (e.g., "good" or "poor") or other suitable growth classification for the clone. The cl growth assessment algorithm may compare various pixel sizes/numbers and/or cl counts (or changes in those quantities over time) to respective thresholds, for example. As another example, the cell growth assessment algorithm may include a neural network that accepts the various pixel sizes/numbers and/or cl counts as inputs, and outputs the growth classification or score. Alternatively, growth information (e.g., day-specific cell counts and/or colony pixel sizes, etc.) may be displayed to a user to hep the user assess the growth profile of the clone.

If a clone is manually or automatically determined to have an adequate growth profile, and if any other relevant criteria are satisfied (e.g., relating to one or more product quality metrics), the clone may be advanced to one or more additional stages of a cell Ine development process. For example, a cell of the cell line may be introduced to a new culture environment and cultured. The cell Ine may then be used for any of a wide range of purposes, depending on the embodiment. For example, the cel line may be used to provide cells that produce antibodies or hybrid molecules for a biopharmaceutical product (e.g., drugs containing bispecific T cell engager (BiTE®) antibodies, such as BLINCYTO® (blinatumomab), or monoclonal antibodies, etc.), or to provide cells for research and/or development purposes.

BRIEF DESCRIPTION OF THE DRAWINGS

The sidled artisan will understand that the figures, described herein, are included for purposes of illustration and do not limit the present disclosure. The drawings are not necessarily to scale, and emphasis is instead placed upon illustrating the principles of the present disclosure. It is to be understood that, in some instances, various aspects of the described Implementations may be shown exaggerated or enlarged to facilitate an understanding of the described implementations. In the drawings, like reference characters throughout the various drawings generally refer to functionally similar and/or structurally similar components.

FIGS. 5A and 58 depict prior art convolutional neural networks.

DETAILED DESCRIPTION

The various concepts introduced above and discussed in greater detail below may be implemented in any of numerous ways, and the described concepts are not limited to any particular manner of implementation. Examples of Implementations are provided for illustrative purposes.

Figure 1:
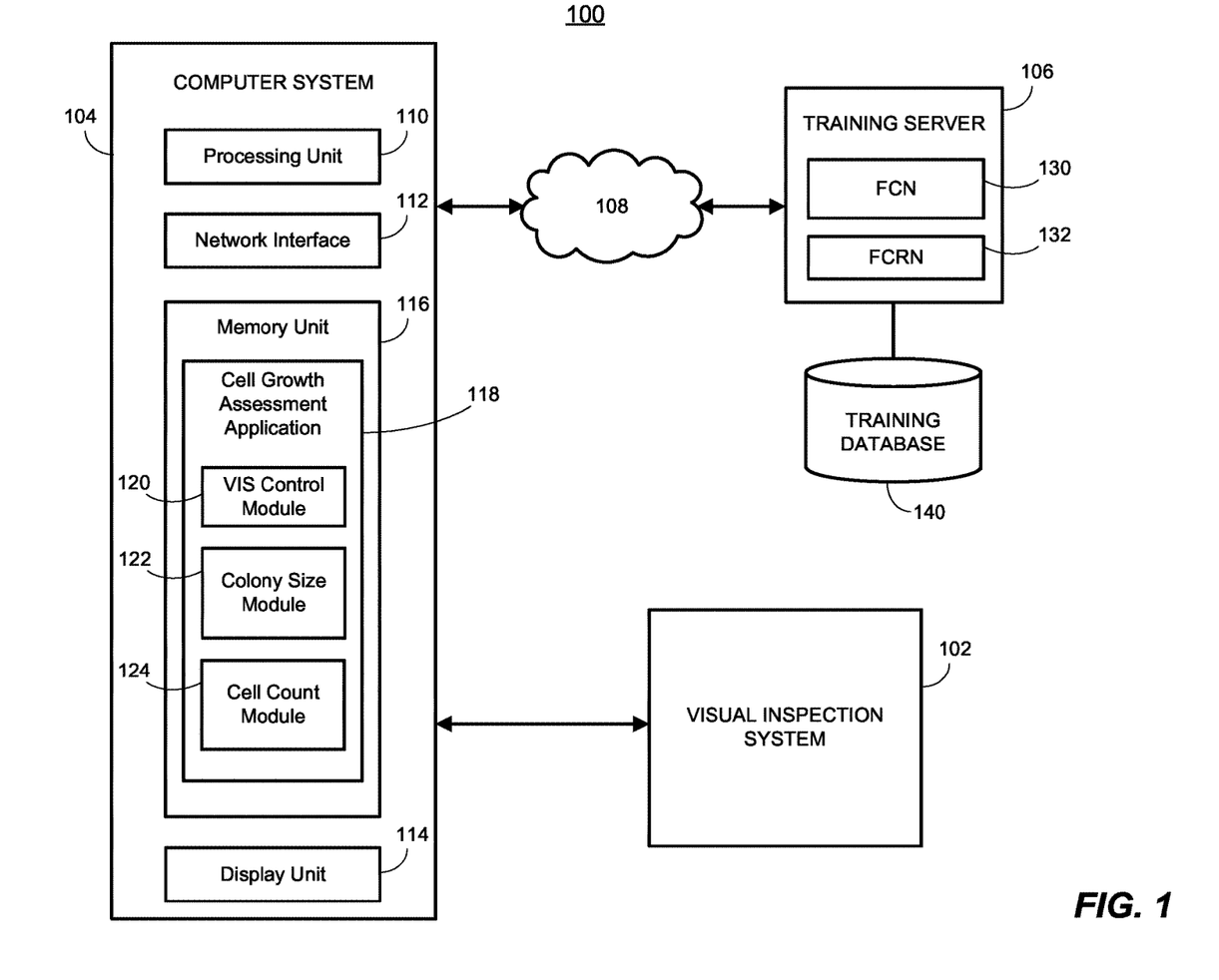
FIG. 1 is a simplified block diagram of an example system that may implement the techniques described herein.
Figure 2:
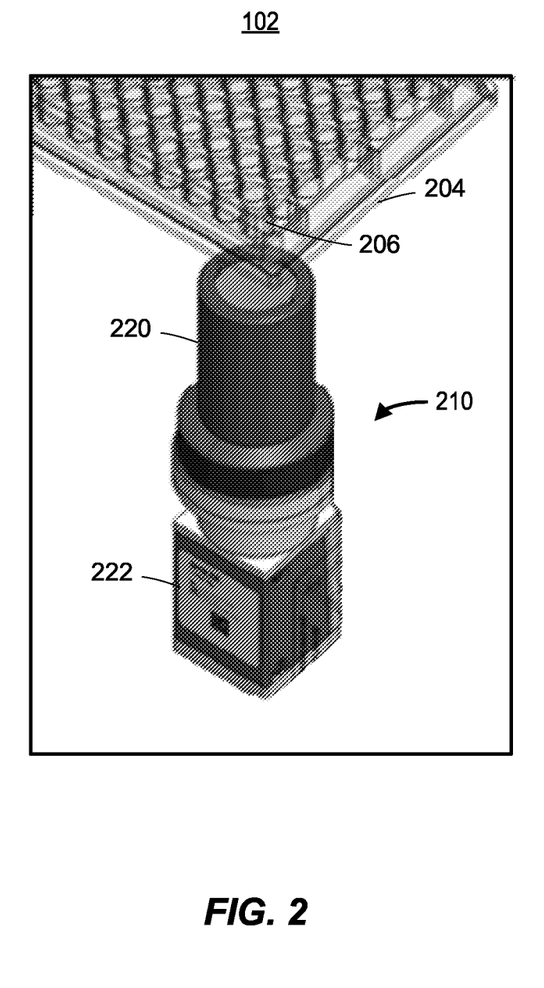
FIG. 2 depicts an example visual inspection system that may be used in the system of FIG. 1.

FIG. 1 is a simplified block diagram of an example system 100 that may implement the techniques described herein. The system 100 includes a visual inspection system 102 communicatively coupled to a computer system 104. The visual inspection system 102 includes hardware (e.g., a well plate stage, illumination source, one or more lenses and/or mirrors, an imager, etc.), as well as firmware and/or software, that is configured to capture digital images of wells within a well plate. One example embodiment of the visual inspection system 102 is shown in FIG. 2, which omits some components for clarity. In the embodiment of FIG. 2, the visual inspection system 102 may include a stage (not shown in FIG. 2) that is configured to receive a well plate 204 containing a number of wells 206. The well plate 204 may be any suitable size, any suitable shape, and have any suitable number of wells 206 disposed thereon (e.g., 6, 24, 96, 384, 1536, etc.). Moreover, the wells 206 may be arranged in any suitable pattern on the welp late 204, such as a 2:3 rectangular matrix, for example.

The visual inspection system 102 further includes an imager 210 that is configured to acquire wide-field images. In some embodiments, the visual inspection system 102 may also include one or more additional imagers (e.g., the high-magnification imager described in PCT Patent Application No. PCT/US19/63177 (PCT Patent Publication No. WO 2020/10112723)). The visual inspection system 102 also includes an illumination system (not shown in FIG. 2) that may include any suitable number and/or type(s) of light source(s) configured to generate source light, and illuminates a well 206 in the well plate 204 when that well 206 is positioned in the optical path of the imager 210. The imager 210 comprises a telecentric lens 220 and a wide-field camera 222. The telecentric lens 220 may be a 1× magnification, high-fidelity telecentric lens, and the wide-field camera 222 may be a charge-coupled device (CCD) camera, for example. In some embodiments, the imager 210 is configured, and positioned relative to the stage, such that it can capture images that each depict an entire single well 206, at a suitable level of resolution, when the well 206 is appropriately positioned on the stage and illuminated by the illumination system. In some embodiments where the visual inspection system 102 includes a second imager for high magnification/resolution, the second imager may include a magnifying objective lens (e.g., a 20× magnification, long-working distance objective lens) and a high-resolution camera (e.g., another CCD camera).

In some embodiments, each of the wells 206 in the well plate 204 has one or more transparent and/or opaque portions. For example, each of the wells 206 may be entirely transparent, or may have a transparent bottom with the side wells being opaque. Each of the wells 206 may generally be cylindrical, or have any other suitable shape (e.g., a cube, etc.). The visual inspection system 102 may image all of the wells 206 of the well plate 204 (e.g., sequentially). To this end, the visual inspection system 102 may be configured to move the stage along one or more (e.g., x and y) axes to successively align each of the wells 206 with the illumination system and the optical path of the imager 210 for individual well analysis. For example, the stage may be coupled to one or more motorized actuators. As each of the wells 206 is aligned with the illumination system and the optical path of the imager 210, the imager 210 acquires one or more images of the illuminated well 206. My cells in a given well 206 may generally e in a flat plane on the base of the well 206, in which case the well 206 may be imaged from a top-down or bottom-up perspective. In such embodiments, the visual inspection system 102 may also be configured to move the stage in the vertical (z) direction to maintain focus on the flat, thin layer in which cels may reside. The visual inspection system 102 may also apply any suitable technique(s) to mitigate vibration, and/or to mechanically support high-fidelity using, both of which may be particularity important if high-magnification imaging is used.

It is understood that FIG. 2 shows only an example embodiment of the visual inspection system 102, and that others are possible. Moreover, the example visual inspection system 102 of FIG. 2 may include other components in addition to those noted above. For example, the visual inspection system 102 may also include one or more communication interfaces to enable communication with the computer system 104, and a controller with one or more processors to provide local control of the operations of the stage, the illumination system, and/or the imager 210 (e.g., in response to commands received from the computer system 104).

Referring again now to FIG. 1, the computer system 104 may generally be configured to control/automate the operation of the visual inspection system 102, and to receive and process images capture&/generated by the visual inspection system 102, as discussed further herein. The computer system 104 is also coupled to a training server 106 via a network 108. The network 108 may be a single communication network, or may include multiple communication networks of one or more types (e.g., one or more wired and/or wireless local area networks (LANs), and/or one or more wired and/or wireless wide area networks (WANs) such as the Internet). The training server 106 is generally configured to train one or more machine learning models, which the training server 106 makes accessible to the computer system 104 via the network 108 to enable the computer system 104 to perform one or more image processing operations on the images generated by the visual inspection system 102. In various embodiments, the training server 106 may provide its machine learning model(s) as a "cloud" service (e.g., Amazon Web Services), or the training server 106 may be a local server. In an alternative embodiment, the machine learning model(s) is/are transferred to the computer system 104 by a network download or other technique (e.g., by physically transferring a portable storage device to the computer system 104). In other embodiments, the computer system 104 itself performs the model training, in which case the system 100 may omit both the network 108 and the training server 106. In still other embodiments, some or all of the components of the computer system 104 shown in FIG. 1 (e.g., one, some or all of the application modules discussed below) are instead included in the visual inspection system 102, in which case the visual inspection system 102 may communicate directly with the training server 106 via the network 108.

The computer system 104 may be a general-purpose computer that is specifically programmed to perform the operations discussed herein, or may be a special-purpose computing device. As seen in FIG. 1, the computer system 104 includes a processing unit 110, a network interface 112, a display unit 114 and a memory unit 116. In some embodiments, however, the computer system 104 includes two or more computers that are either co-located or remote from each other. In these distributed embodiments, the operations described herein relating to the processing unit 110, the network interface 112, the display unit 114 and/or the memory unit 116 may be divided among multiple processing units, network interfaces, memory units and/or display units, respectively.

The processing unit 110 includes one or more processors, each of which may be a programmable microprocessor that executes software instructions stored in the memory unit 116 to execute some or al of the functions of the computer system 104 as described herein. The processing unit 110 may include one or more graphics processing units (GPUs) and/or one or more central processing units (CPUs), for example. Alternatively, or in addition, some of the processors in the processing unit 110 may be other types of processors (e.g., application-specific integrated circuits (ASICs), field-programmable gate arrays (FPGAs), etc.), and some of the functionality of the computer system 104 as described herein may instead be implemented in hardware.

The network interface 112 may include any suitable hardware (e.g., front-end transmitter and receiver hardware), firmware, and/or software configured to communicate with the training server 106 via the network 108 using one or more communication protocols. For example, the network interface 112 may be or include an Ethernet interface, enabling the computer system 104 to communicate with the training server 106 over the Internet or an intranet, etc.

The display unit 114 may include one or more output devices, such as a computer monitor or touchscreen, and may be integrated into a device of the computer system 104 or operate as a peripheral device. The display unit 114 may utilize any suitable display technology or technologies (e.g., LED, OLED, LCD, etc.). While not shown in FIG. 1, the computer system 104 may also include one or more input devices configured to accept user inputs (e.g., a keyboard, microphone, touchscreen, etc.). Display unit 114 (and any input device(s)) may include not only suitable hardware, but also the associated firmware and/or software (e.g., display driver software).

The memory unit 116 may include one or more volatile and/or non-volatile memories. Any suitable memory type or types may be included, such as read-only memory (ROM), random access memory (RAM), flash memory, a solid-state drive (SSD), a hard disk drive (HDD), and so on. Collectively, the memory unit 116 may store the instructions of one or more software applications, as well as the data received/ used by those applications and the data output/generated by those applications (when executed by the processing unit 110).

In the example system 100, one such application is a cell growth assessment application 118. In general terms, when executed by the processing unit 110, the cel growth assessment application 118 runs one or more algorithms that either provide outputs to assist a user in making a "final" or overall growth assessment for a particular cell line (e.g., when presented on the display unit 114), or use such outputs to automatically generate an overall growth assessment for the cl line, depending on the embodiment. While various modules of the application 118 are discussed below, it is understood that those modules may be distributed among different software applications, and/or that the functionality of any one such module may be divided among different software applications.

The application 118 may include a visual inspection system (VIS) control module 120, a colony size module 122, and a cell count module 124. In some embodiments, the application 118 includes more, fewer and/or different modules. For example, the application 119 may exclude the VIS control module and/or the cell count module 124.

The VIS control module 120 controls/automates operation of the visual inspection system 102, via commands or other messages, such that images of samples within the wells 206 of the well plate 204 can be generated with little or no human interaction. The visual inspection system 102 may send the captured images to the computer system 104 for storage in the memory unit 116, or another suitable memory not shown in FIG. 1.

The colony size module 122 generally processes well images received from the visual inspection system 102 to determine which portion(s) of each image represent a cell colony (or a portion of a cel colony). The colony size module 122 may process each well image using a fully convolutional neural network ("FCN) 130 to generate a heatmap" having a smaller pixel size (i.e., fewer pixels) than the well image. More precisely, the output of the FCN 130 may be a down-sampled segmentation map that provides a relatively low-resolution indication of which portions of the well image represent a cel colony or colony portion. The FCN 130, and the down-sampled segmentation map that it generates, are discussed in further detail below with reference to FIG. 6. FIG. 1 shows the FCN 130 as residing at (i.e., being stored in a memory of) the training server 106, reflecting an embodiment in which the colony size module 122 runs the FCN 130 by utilizing a web service or accessing a local server. As noted herein, however, other embodiments are also possible (e.g., storing and accessing the FCN 130 locally at the computer system 104).

The cel count module 124 generally processes well images received from the visual inspection system 102 to determine the exact number of cells in each well image. In some embodiments, the cell count module 124 processes each well image to identify each single cell (e.g., as opposed to a doublet or debris) in the image, and then sums up the number of single cels that are so identified to determine a total ci count. For example, the cel count module 124 may run a convolutional neural network to identify/classify single cells (e.g., as described in PCT Patent Application No. PCT/JS19/63177 (PCT Patent Publication No. WO 2020/0112723)). In other embodiments, the cel count module 124 uses a technique that does not require object detection (i.e., without first identifying single cels). In the embodiment shown in FIG. 1, for example, the cel count module 124 determines the cel count for a given well image by inputting the well image to a fully convolutional regression network (FCRN) 132, such as is described in Xie et al., which determines a cell count based on density estimation rather than object detection or segmentation. The FCRN 132 may be the "FCRN-A" or "FCRN-B" variant discussed in Xie et al., for example, or may be another suitable type of FCRN. FIG. 1 shows the FCRN 132 as residing at (i.e., being stored in a memory of) the training server 106, reflecting an embodiment in which the cel count module 124 runs the FCRN 132 by utilizing a web service or accessing a local server. As noted above, however, other embodiments are also possible (e.g., storing and accessing the FCRN 132 locally at the computer system 104).

As discussed in more detail below with reference to FIG. 3, the application 118 may utilize the cel count module 124 for one or more relatively early-stage well images (e.g., from the first several days of incubation), and utilize colony size module 122 for one or more late-stage well images (e.g., after a week or so of incubation when a precise cell count becomes impractical due to cel stacking). Moreover, as is also discussed below in connection with FIG. 3, the application 118 may run a higher-level algorithm to assess growth for a particular clone based on outputs generated by the cel count module 124 and the colony size module 122.

Operation of the system 100, according to some embodiments, will now be described with reference to FIGS. 1 and 2. Initially, the training server 106 (i.e., one or more processors of the server 106) trains the FCN 130 and the FCRN 132 (or, in other embodiments, different types of machine learning models utilized by the modules 122,124) using data stored in a training database 130. The training database 130 may include a single database stored in a single memory (e.g., HDD, SSD, etc.), a single database stored across multiple memories, or multiple databases stored in one or more memories. For each of the neural networks 130,132, the training database 130 may store a corresponding set of training data (e.g., input/image data, and corresponding labels).

In some embodiments, the training images for the FCN 130 (stored in the training database 140) are image "patches," which are smaller, cropped versions of the full well images. For example, the training images may be obtained by automatically capturing well images using the visual inspection system 102 as described above (and/or using one or more other, similar systems), and then manually or automatically cropping the well images such that each cropped image (image patch) only depicts a portion of a well and its contents. For example, if a full well image has a size of 3333×3333 pixels (or 3495×3495 pixels, etc.), each image patch may have a size of only 64×64 pixels (or 32×32 pixels, or 128×128 pixels, etc.). The absence of transpose layers/ up-sampling in the FCN 130 permits the use of this cropping technique for training, which in turn greatly reduces the burden of generating the training image library. For example, a user may only need to provide a sing label for each image path (e.g., a sing label that applies to all 64×64 pixels of the image patch), rather than labeling each of the many pixels of each well image. In other embodiments, finer labeling of the image patch is used (e.g., labeling pixel subsets in each image patch). In some embodiments, the training images for the FCRN 132 (also stored in the training database 140) are also image patches derived from well images, but are labeled on a pixel-by-pixel basis.

After the training images are manually labeled (e.g., using labeling software that presents training images on a GUI, and accepts labels as user Inputs), the training server 106 uses the appropriate images and labels to train the FCN 130 and the FCRN 132. For example, the training server 106 may use single-labeled image patches to train the FCN 130, and may use pixel-wise labeled image patches to train the FCRN 132.

After the server 106 trains the FCN 130 and the FCRN 132, and after validation of the trained models 130,132, the computing system 104 may use the trained models 130,132 to assess (or facilitate the assessment of) growth rates for a particular clone that was used to inoculate the wells 206 in the well plate 204. Initially, each of the wells 206 within the well plate 204 of the visual inspection system 102 may be at least partially filled, either automatically or manually, with a medium that includes suitable nutrients for cells (e.g., amino acids, vitamins, etc.), growth factors, and/or other ingredients. In some embodiments and/or scenarios, an attempt is made to inoculate each well 206 with one, and only one, clone cell. For example, a flow cytometry technique such as a fluorescence-activated cell sorting (FACS) technique may be used to inoculate each of the wells 206 with a single clone cell. Alternatively, a single well 206 may be seeded with multiple cels of the clone.

The well plate 204 is then loaded onto a stage, and the VIS control module 120 causes the visual inspection system 102 to move the stage in small increments (e.g., in the x and/or y directions), and to activate the imager 210 (and possibly an associated illumination system) in a synchronized manner, such that the imager 210 captures at least one image for each of the wells 206. This initial image of each well 206 may be captured very shortly after inoculation, during the first day of incubation, and may depict the entire area of each well 206 (e.g., from a bottom-up view). The visual inspection system 102 may store each well image locally, or may immediately transfer each image to the computer system 104 (e.g., for storage in the memory unit 116).

The process of imaging the wells 206 may be repeated at regular or irregular intervals, depending on the embodiment and/or scenario. For example, VIS control module 120 may cause the visual inspection system 102 to image each of the wells 206 once per day over some predefined incubation period (e.g., 10 days, 14 days, etc.), or once per two or three days, etc. Alternatively (e.g., in some embodiments where the application 118 omits the cell count module 124), the wells 206 may be imaged only at the very beginning and end of the incubation period (e.g., at day one and at day 14 of a 14-day incubation period), or only at the beginning, mid-point and end of the incubation period, etc. Either as the well images are generated, or in batches after subsets (or all) of the images have been generated, the visual inspection system 102 sends the images to the computer system 104 for automated analysis. As with the process of capturing well images, the process of transferring images to the computer system 104 may be automated (e.g., triggered by commands from the VIS control module 120).

Either as well images are received, or at some later time (e.g., after the entire incubation period has ended), the application 118 processes the well images to assess cell growth, or to facilitate a manual cell growth assessment, as generally discussed above. FIG. 3 depicts various algorithms that the application 118 may implement to this end, as part of an example process 300 executed (at least in part) by the system 100. It is understood, however, that the application 118 may also or instead use other suitable algorithms. All well images discussed in connection with FIG. 3 may be captured by the imager 210 of the visual inspection system 102, when controlled by the VIS control module 120, for example.

In the example process 300, at a preliminary stage 302, FACS subcloning is used to inoculate individual wells (e.g., the wells 206 within the well plate 204) with clone cells. In other embodiments, flow cytometry techniques other than FACS subcloning may be used at stage 302. During an initial stage of the incubation period (e.g., soon after inoculating the wells 206, on the first day), at a first stage 304-1, at least one image of each well 206 is generated, resulting in a first set 306-1 of well images (e.g., 96 images for a 96-well plate). At a second stage 304-2, at least one additional image of each well 206 is generated, resulting in another well image set 306-2. Stage 304-2 may occur one day after inoculation, for example, or after some other suitable time period (e.g., two or three days after stage 304-1, etc.). At a third stage 304-3, at least one additional image of each well 206 is generated, resulting in another well image set 306-3. Stage 304-3 may occur two days after inoculation, for example, or after some other suitable time period (e.g., one or two days after stage 304-2, etc.). This may occur for N stages, where N is any suitable integer greater than one, and where the $N^{th}$ stage 304-N may occur at or near the end of the incubation period. In some embodiments where the application 118 only estimates colony sizes, however, well images may be captured in as little as one stage (e.g., only at stage 304-N, which may be at the end of the incubation period). In some embodiments, stage 304-1 occurs on the first day of incubation, and the subsequent stages 304-2 through 304-N occur at one or two day intervals. The entire incubation period may be 14 days, for example, with stages 304-1 through 304-14 occurring at regular, one-day intervals to generate 14 well image sets 306-1 through 306-14.

Figure 4:
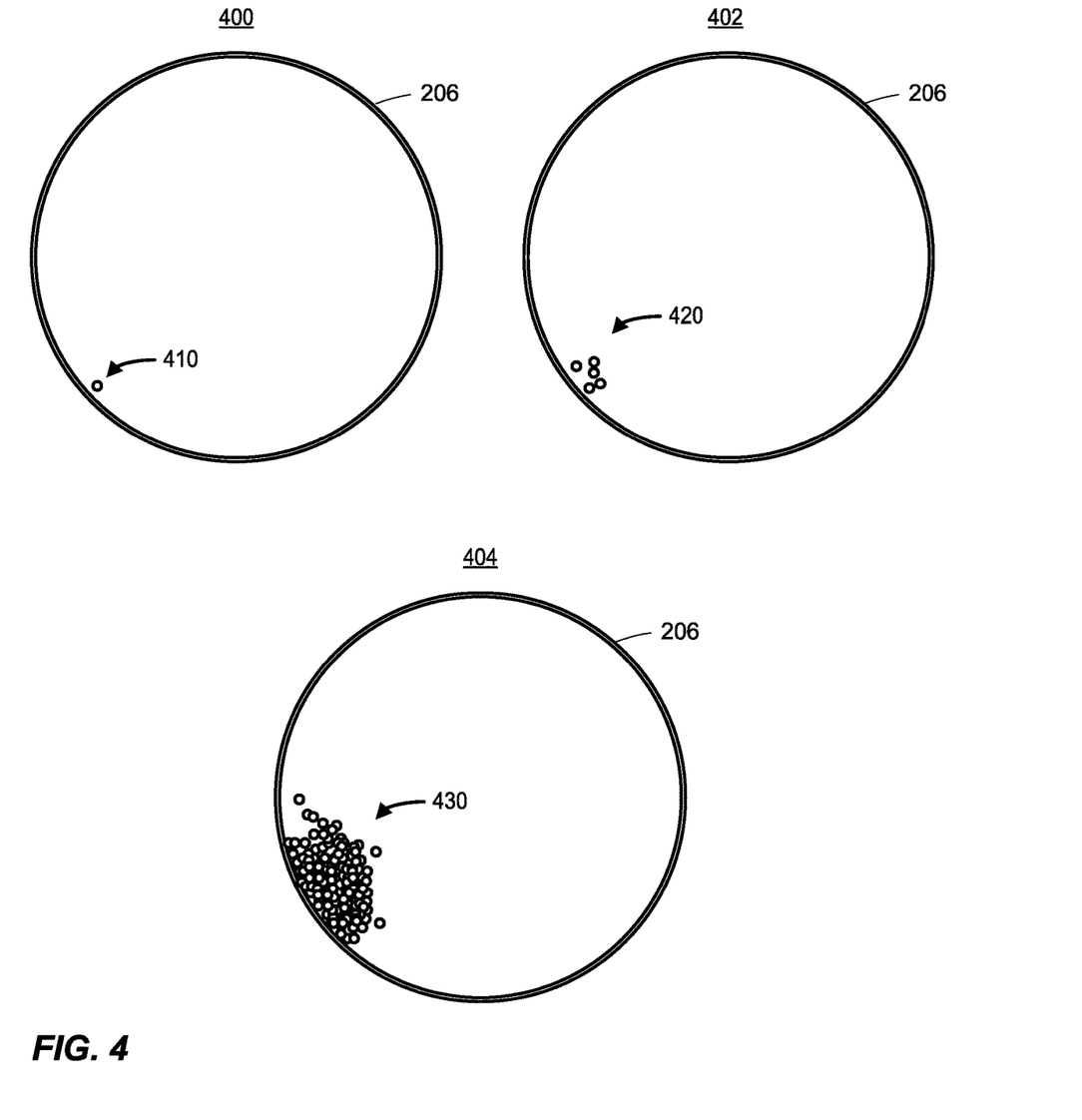
FIG. 4 depicts example well images that may be generated by the visual inspection system of FIG. 1 over the course of an incubation period.

FIG. 4 depicts example images 400, 402 and 404 that may correspond to a single well 206 at three different, respective times (e.g., at stages 304-1, 304-2 and 304-3). Each of the images 400, 402, 404 represents a bottom-up or top-down perspective of the well 206, and depicts the entirety of the contents of the well 206. It is understood that, in some embodiments, the well images 400, 402, 404 may also include some area outside the periphery of the well 206 (e.g., if the images are rectangular). As seen in FIG. 4, in this example, well image 400 includes a single clone cell 410, well image 402 includes a very small colony 420 of five cells, and well image 404 includes a moderately large colony 430 in which many cels are stacked (i.e., partially or wholly obscure other cels of the colony 430).

Figure 3:
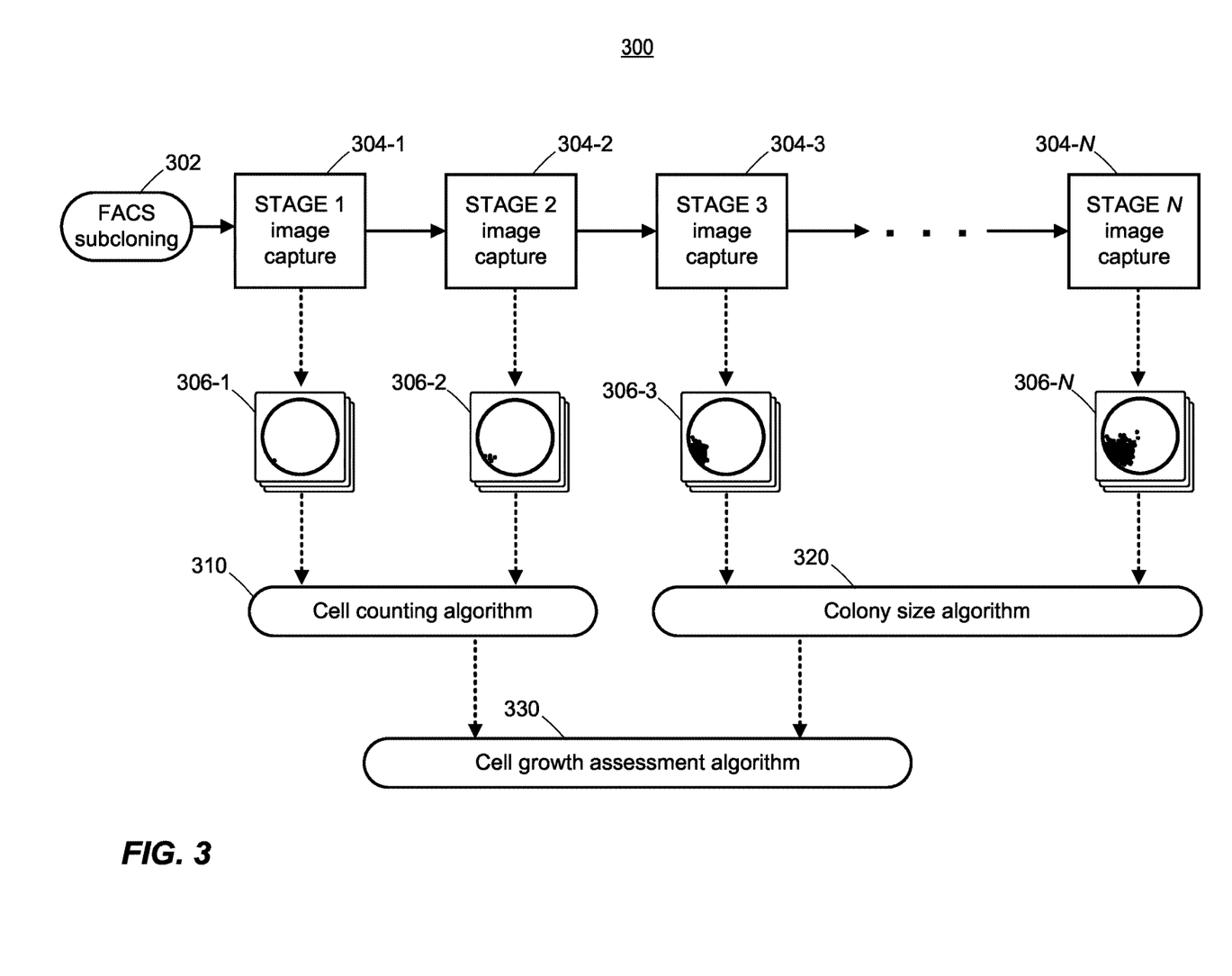
FIG. 3 is a diagram of an example process for assessing cell growth in an inoculated well.

In the example embodiment of FIG. 3, the well image sets 306-1 and 306-2 are processed via a cell counting algorithm 310 implemented by the cel counting module 124, while the remaining well image sets 306-3 through 306-N are processed via a colony size algorithm 320 implemented by the colony size module 122. In particular, implementation of the cell counting algorithm 310 may comprise processing each image of a given well image set 306 with the FCRN 132 (or another suitable model utilized by the module 124), and implementation of the colony size algorithm 320 may comprise processing each image of a given well image set 306 with the FCN 130 (or another suitable model utilized by the module 122). The output of the algorithm 310 may be a cell count for each well image and/or the output of the algorithm 320 may be a down-scaled segmentation map (or a number of pixels in the map that represent a colony), for example.

While FIG. 3 shows the well image sets 306-1 and 306-2 being processed via algorithm 310 and the well image sets 306-3 through 306-N being processed via algorithm 320, different well image sets (and/or a different number of well image sets) may be processed by one or both of the algorithms 310, 320, in other embodiments and/or scenarios. For example, the cel counting algorithm 310 may not process any images of the well image set 306-1 (e.g., image 400) if it can safely be assumed that each of the wells 206 initially included only one Clone cel. As another example, the module 124 may apply the cell counting algorithm 310 to more than the first two stages 306-1, 306-2, and/or the module 122 may apply the colony size algorithm 320 to fewer than the last (N−2) stages 306-3 through 306-N. In some embodiments and/or scenarios, one or more of the well image sets 306 are not processed by either module 122 or module 124.

In some embodiments, the application 118 dynamically determines, at each of one or more of the stages 304, whether the application 118 should apply the algorithm 310 and/or the algorithm 320 to the respective well image set 306. For example, for a given stage 304, the module 124 may first attempt to apply the cel counting algorithm 310 to one, some or al images in a set 306. If the algorithm 310 is unable to determine a cel count (or unable to do so with at least a threshold confidence level, etc.) for some or all well images in the set 306 (e.g., for more than a threshold number of the images), the module 122 may process the image set 306 to generate down-sampled segmentation maps and/or corresponding pixel counts indicative of colony sizes. In the example of FIG. 4, for instance, the algorithm 310 may successfully count cells in the well images 400 and 402, but fail to count cels in the well image 404. In response to this failure, the algorithm 320 may process the well image 430 to generate a down-sampled segmentation map that indicates the approximate shape/area/boundaries of the colony 430 (e.g., excluding stray cels that are not in contact with other cels in the colony 430).

Also in the example process 300, the application 118 implements a cell growth assessment algorithm 330 that operates on the outputs of the algorithms 310,320 to make an "overall" growth assessment for the clone under consideration. Algorithm 330 may take any suitable form. For a given well 206, for example, the algorithm 330 may compare the cel counts generated by the cel counting algorithm 310 to day/stage-specific thresholds (and/or compare absolute, percentage or ratio increases between stages 304 to thresholds, etc.), and/or may compare pixel counts generated by the colony size algorithm 320 to day/stage-specific thresholds (and/or compare absolute, percentage or ratio increases in pixel counts between stages 304 to thresholds, etc.). The application 118 may then output an indication of growth (e.g., a score, or a classification such as "good," "moderate," "poor" or "none") based on the comparison(s). In other embodiments, implementation of the algorithm 330 includes running another machine learning model that operates on outputs of the algorithms 310 and/or 320. For example, the training server 106 may additionally train and/or store a neural network that is configured to (e.g., for each well image) accept inputs from algorithms 310, 320 (e.g., day/stage-specific cel counts and day/stage-specific colony pixel numbers/sizes) and output a growth classification (e.g., "good," "moderate," "poor" or "none") or score.

In some embodiments, the cell growth assessment algorithm 330 also performs one or more other operations as a check on the process 300. For example, the algorithm 330 may use one or more neural networks (e.g., trained and/or stored by the server 106) to verify that a cell colony detected by the algorithm 320 originated from just a single clone cell. For example, the algorithm 330 may accomplish this via any suitable techniques described in PCT Patent Application No. PCT/US19/63177 (PCT Patent Publication No. WO 2020/0112723).

In some embodiments, the application 118 does not include/support the cl growth assessment algorithm 330, and instead causes the display unit 114 to display outputs of the algorithm 310 (e.g., a per-well, per-day/stage cell count) and outputs of the algorithm 320 (e.g., a per-well, per-day/stage down-sampled segmentation map and/or pixel counts representing how many pixels in the maps correspond to areas in which cel colonies are inferred to be present). A user of the computer system 104 may then view the information on the display unit 114 to more subjectively assess the growth profile for the clone. Additionally or alternatively, in some embodiments, the application 118 does not include/support the cell counting algorithm 310.

The output of the cell growth assessment algorithm 330, or the assessment of a user observing the outputs of the algorithm 310 and/or 320, may dictate whether the clone should be rejected or advanced to the next cell line development stage. The cell line development may be for any suitable purpose, depending on the embodiment and/or scenario. For example, the cell Ine may be used to develop antibodies or hybrid molecules for a biopharmaceutical product (e.g., bispecific T cell engager (BiTE®) antibodies, such as for BLINCYTO® (blinatumomab), or monoclonal antibodies, etc.), or may be used for research and/or development purposes. As one example, the next stage of cell line development to which the clone is advanced (or not advanced) may include introducing a cell of the cell line in a new culture environment (e.g., a bioreactor). Information on cell culture can be found, for example, in Green and Sambrook, "Molecular Cloning: A Laboratory Manual" (4th edition) Cold Spring Harbor Laboratory Press 2012, which is incorporated by reference herein in its entirety.

Figure 5A:
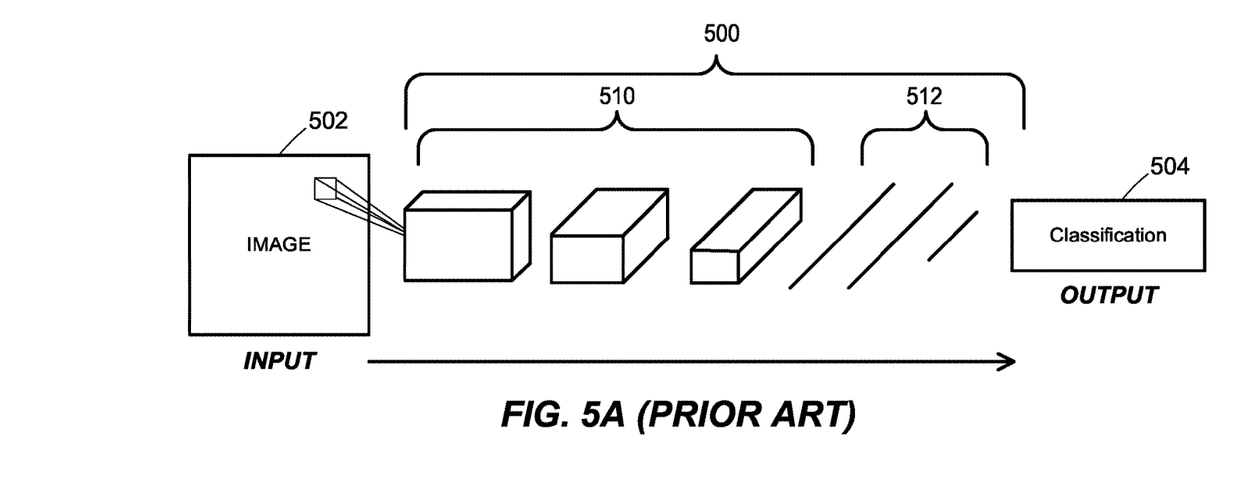

As noted herein, the FCN 130 implemented by the colony size module 122 (e.g., to execute the algorithm 320) may be a modified version of the FCN described in Long et al., which in turn builds upon older CNNs such as the CNN 500 shown in FIG. 5A. As seen in FIG. 5A, the CNN 500 operates on an input image 502 to output a classification 504. The CNN 500 includes one or more convolutional layers 510, which generally detect features within the image 502. Earlier convolutional layers generally detect lower-level features such as edges or corners, while later convolutional layers generally detect more abstract features such as overall shapes. While not shown in FIG. 5A, the convolutional layers 510 may be interspersed with any suitable number of pooling layers (i.e., down-sampling layers that reduce computation while preserving the relative locations of features) and/or rectified linear unit (ReLU) layers that apply activation functions. The CNN 500 also includes any suitable number (greater than zero) of fully connected layers 512, which generally provide high-level reasoning based on features detected by the earlier layers. Specifically, the fully connected layers 512 determine the classification 504 based on the features detected by the earlier layers.

Figure 5B:
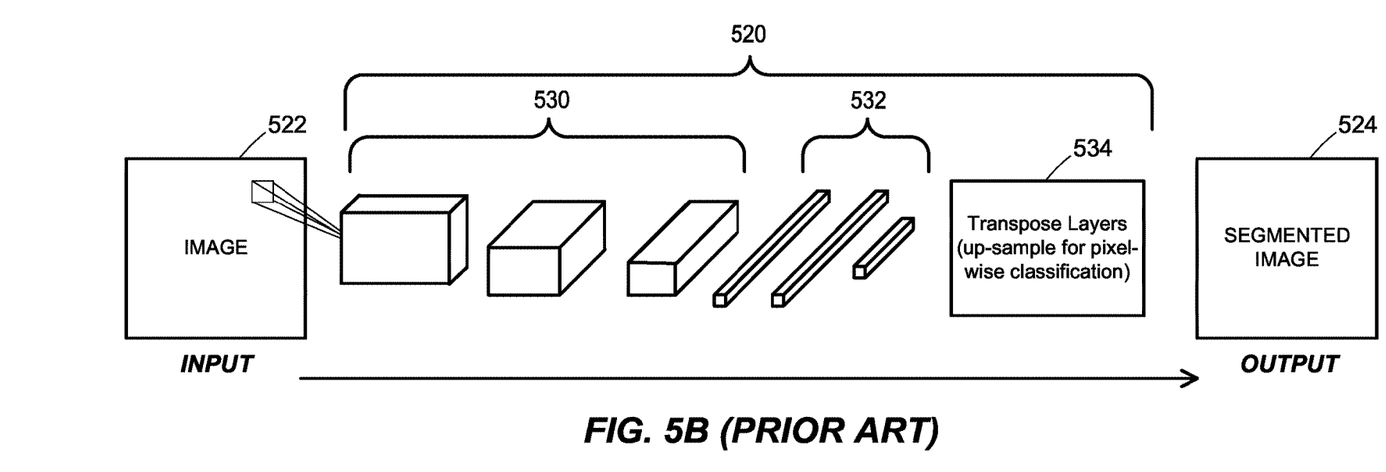

FIG. 5B depicts an example FCN 520, which operates on an image 522 to output a segmented image 524, where the segmented image 524 is the same size as the input image 522, and indicates a classification for each pixel of the input image 522 (e.g., "cat" versus "not cat" or "cat" versus "ground" versus "sky," etc.) rather than a single, overall image classification. Similar to the CNN 500, the FCN 520 includes one or more convolutional layers 530, which may be interspersed with pooling and/or ReLU layers not shown in FIG. 5B. Unlike the CNN 500, however, the FCN 520 does not include any fully connected layers that determine a whole image classification, and instead includes additional convolutional layers 532. The additional convolutional layers 534 generate a heatmap (i.e., a down-sampled segmentation map) of the image 522. The heatmap is provided to a suitable number (greater than zero) of transpose layers 534, which are also referred to as "deconvolution layers." The transpose layers 534 up-sample the heatmap to provide pixel-by-pixel classification of the entire image 522, which can then be represented as the segmented image 524. The operation of the FCN 520 is explained in more detail in Long et al.

Figure 6:
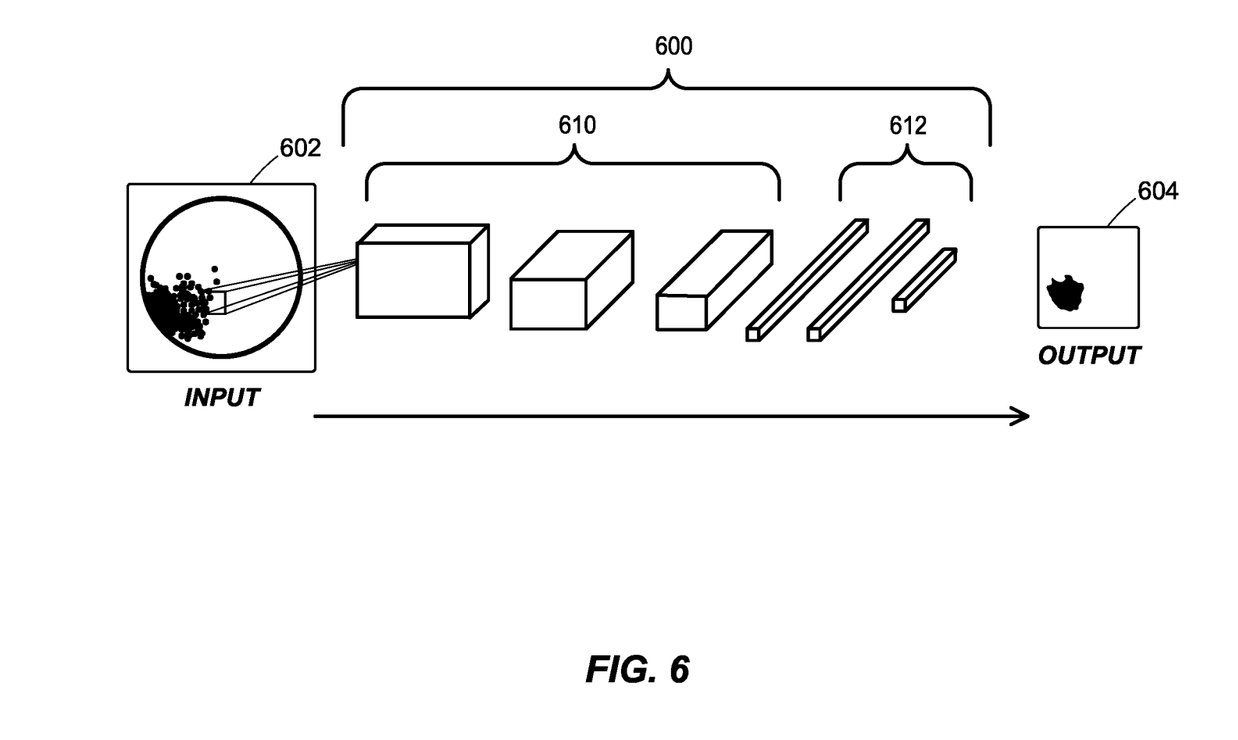
FIG. 6 depicts a modified, fully convolutional neural network that may be used in the system of FIG. 1.

An example modified FCN 600 is shown in FIG. 6. The modified FCN 600 may be used as the FCN 130 of FIG. 1, for example. While referred to herein as a "modified" FCN, it is understood that the FCN 600 need not have been actively modified relative to any particular starting point. Instead, the term "modified" is used to indicate that the architecture of the FCN 600 is different than the architecture of the FCN described in Long et al.

The modified FCN 600 operates on an image 602 (e.g., in this case, an image from one of well image sets 306) to output a down-sampled segmentation map 604, where the map 604 is smaller (i.e., consists of fewer pixels than) the input image 602. Each of some or all pixels of the map 604 may indicate a classification determined by the modified FCN 600 (e.g., "colony" or not colony). Similar to the FCN 520, the modified FCN 600 includes one or more convolutional layers 610, which may be interspersed with pooling and/or ReLU layers not shown in FIG. 6. Also similar to the FCN 520, the modified FCN 600 includes one or more additional convolutional layers 612 in place of fully connected layers (i.e., the modified FCN 600 includes no fully connected layers). Unlike the FCN 520, however, the modified FCN 600 does not include any transpose layers that up-scale the map 604 to generate a full-size, pixel-by-pixel classified image. Instead, the map 604 may be the final output of the modified FCN 600. The operation of the convolutional layers 610, the additional convolutional layers 612, and any pooling and/or other (e.g., ReLU) layers may be as described in Long et al.

Based on its per-pixel classifications, the map 604 indicates where the modified FCN 600 has inferred that a cel colony exists or does not exist in a well image (e.g., in the image 602). Due to its smaller pixel size (i.e., fewer pixels), the map 604 necessarily has less resolution than a full-size segmented image, and therefore less precisely represents cell colony boundaries/shapes. In some embodiments, the application 118 uses simple interpolation to upscale the map 604 to match the pixel size of the input image 602, in order to assist with identifying the cell colony regions (e.g., prior to display to a user).

While the modified FCN 600 provides less resolution/precision than the full-size segmented image of the FCN 520, the former has the advantage that training may be accomplished without pixel-wise labeling of full-size well images, as noted above. Moreover, the relative imprecision of the modified FCN 600 has been found to be relatively insignificant to growth profile assessments, and therefore is substantially outweighed by the relative ease of generating a training image library. Furthermore, the absence of transpose layers in the modified FCN 600 results in fewer processing resources and/or faster inference/classification times for the modified FCN 600 as compared to the FCN 520.

Figure 7:
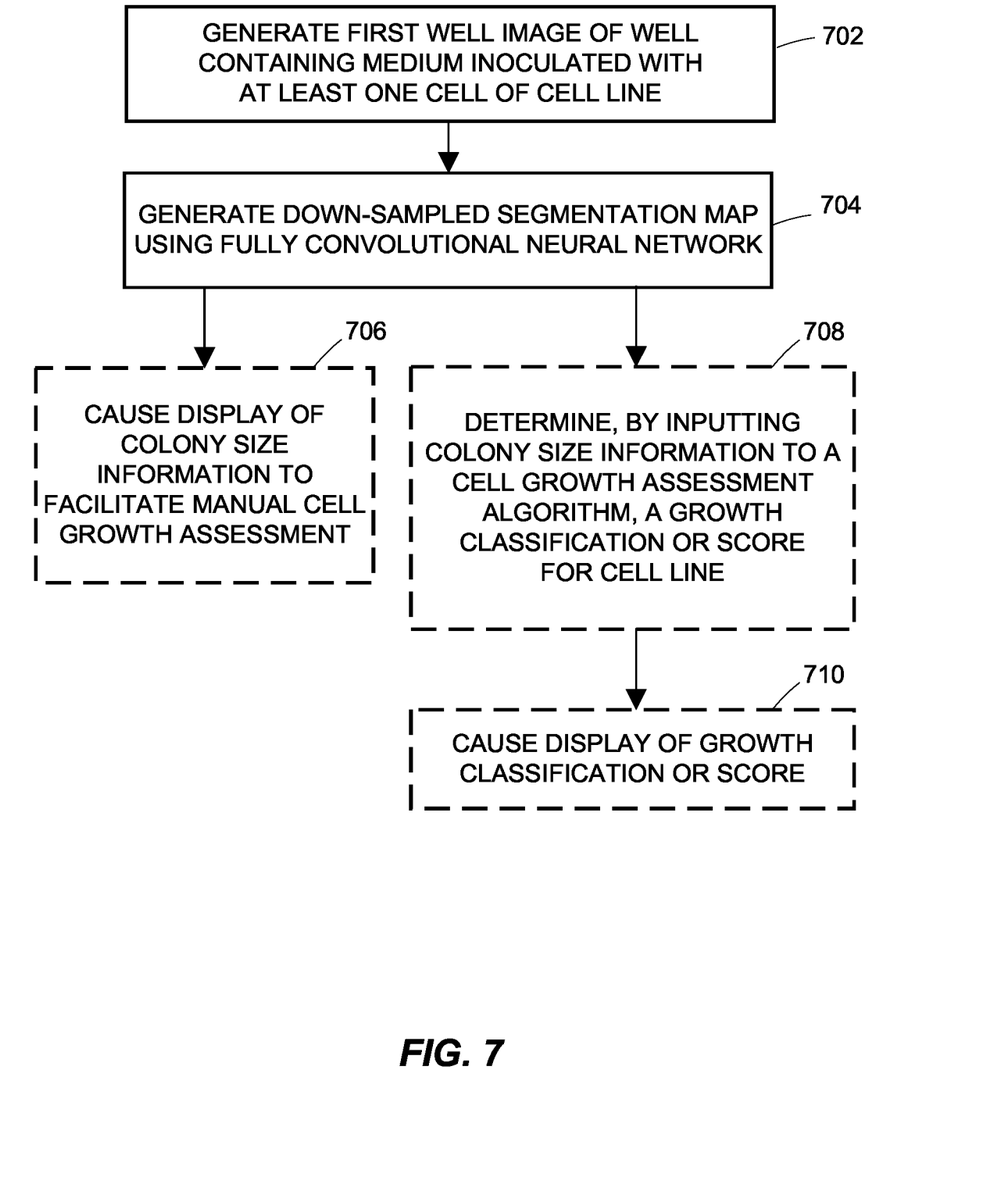
FIG. 7 is a flow diagram of an example method of facilitating a growth assessment for a cel line.

FIG. 7 is a flow diagram of an example method 700 of facilitating a growth assessment for a cel lne (e.g., for clone selection during a cel line development process). The method 700 may be implemented by one or more portions of the system 100 (e.g., the visual inspection system 102 and the computer system 104) or another suitable system. As a more specific example, block 702 may be implemented by the visual inspection system 102, while blocks 704 and 706 (or 704, 708 and 710) may be implemented by the computer system 104 (e.g., by the processing unit 110 when executing instructions of the colony size module 122 stored in the memory unit 116).

At block 702 of the method 700, a first well image is generated. The first well image is an image of a well containing a medium inoculated with at least one cel of the cell line (e.g., an image similar to the well image 404). At block 704, a down-sampled segmentation map is generated using an FCN. The FCN may be the modified FCN 600 of FIG. 6, for example. The pixels of the map indicate an inferred presence or absence of a cel colony in corresponding portions of the first well image. Block 704 may include inputting the first well image to the FCN. The FCN may include no transpose layers (e.g., as in the FCN 600), in which case the map output by the FCN is smaller than (i.e., has fewer pixels than) the first well image.

Depending on the embodiment and/or scenario, the method 700 may include block 706, and/or may include the combination of blocks 708 and 710. At block 706, the display of colony size information is caused (e.g., triggered via a command or other message), in order to facilitate a manual/user cell growth assessment for the cell line. For example, the application 118 may generate a graphical user interface (GUI), or information that populates a GUI, and cause the display unit 114 to present the colony size information within the GUI. The colony size information may include the down-sampled segmentation map (generated at block 704) and/or a pixel count derived from the down-sampled segmentation map (e.g., by the module 124 or another portion of application 118 processing the map), and possibly other relevant information. In methods and systems some embodiments, the "pixel count" is a count of all pixels in the map that have been classified as being within a cel colony by the FCN (e.g., a "pixel area" of the cel colony). Alternatively, the "pixel count" may be a count of how many pixels span the largest dimension (e.g., width or length) of a cell colony depicted in the map, or another suitable type of pixel count that is indicative of colony size.

At block 708, a growth classification or score is determined for the cell line, by inputting the colony size information (i.e., the down-sampled segmentation map and/or pixel count, and possibly other relevant information) to a cl growth assessment algorithm (e.g., the algorithm 330). Next, at block 710, the display of the growth classification or score is caused (e.g., triggered via a command or other message), e.g., to facilitate the determination of whether the clone should proceed to a next stage of cel lne development. For example, the application 118 may generate a GUI, or information that populates a GUI, and cause the display unit 114 to present the classification or score within the GUI.

In some embodiments, the method 700 includes one or more additional blocks not shown in FIG. 7. For example, block 702 may include generating the first well image at a first time, and further generating a second well image (of the same well) at a later, second time, and the method 700 may include an additional block in which a count of at least a subset of the cels present within the well at the second time is determined by processing the second well image. The method 700 may then include causing the display of both the colony size information and the count. For example, the second time may be the end of an incubation period over which a single cel of the cell line is capable of forming a colony. By way of example, the second time may be about 7 days after the first time, for example 4-10 days, 5-9 days, 6-8 days, 6-7 days, or 7-8 days after the first time. By way of example, the second time may be about 14 days after the first time, for example 11-17 days, 12-16 days, 13-15 days, 13-14 days, or 14-15 days after the first time.

As another example, in some embodiments in which the method 700 includes block 708, the method 700 includes an additional block in which the cell line is selectively used or not used in a subsequent stage of cell line development based at least in part on the growth classification or score for the cell line. The subsequent stage may be a new culture environment to which the cell line is selectively advanced or not advanced, for example.

As still another example, the method 700 may include one or more blocks relating to training of the FCN. For example, the method 700 may include a first additional block in which a plurality of well training images is received (e.g., by the training server 106, from the visual inspection system 102 or the computer system 104), a second additional block in which a plurality of image patches are generated (e.g., by the training server 106) at least by cropping each of the well training images to a smaller size, a third additional block in which one or more user-provided labels for each image patch (e.g., a single user-provided label for each image patch) are received (e.g., by the training server 106 from the computer system 104, another computing system, or a peripheral input device of the server 106), and/or a fourth additional block in which the FCN is trained (e.g., by the training server 106) using the image patches and the corresponding user-provided labels.

By way of example, and not limitation, the disclosure herein contemplates at least the following examples:

Example 1. A method of facilitating a growth assessment for a cell line, the method comprising: generating, by an imaging unit, a first well image of a well that contains a medium that was inoculated with at least one cel of the cell line; generating, by one or more processors, a down-sampled segmentation map comprising pixels that indicate an inferred presence or absence of a cel colony in corresponding portions of the first well image, wherein generating the down-sampled segmentation map comprises inputting the first well image to a fully convolutional neural network having a plurality of convolutional layers, and the down-sampled segmentation map has fewer pixels than the first well image; and one or both of (i) determining, by the one or more processors inputting colony size information to a cel growth assessment algorithm, a growth classification or score for the cel line, wherein the colony size information includes the down-sampled segmentation map and/or a pixel count derived from the down-sampled segmentation map, and causing, by the one or more processors, a display of the growth classification or score, and (ii) causing, by the one or more processors, a display of the colony size information to facilitate a manual cell growth assessment.

Example 2. The method of example 1, wherein generating the down-sampled segmentation map comprises inputting the first well image to a fully convolutional neural network comprising a plurality of convolutional layers and no transpose layers.

Example 3. The method of example 1 or 2, wherein: generating the first well image comprises generating the first well image at a first time, and further comprises generating a second well image at a second time earlier than the first time; and the method further comprises determining, by the one or more processors processing the second well image, a count of at least a subset of cels present within the well at the second time.

Example 4. The method of example 3, wherein: the method comprises causing the display of the colony size information; and the method further comprises causing, by the one or more processors, a display of the count.

Example 5. The method of example 3 or 4, wherein the method comprises: determining the growth classification or score for the cell line by inputting at least the colony size information and the count to the cell growth assessment algorithm; and causing the display of the growth classification or score.

Example 6. The method of any one of examples 1 through 5, wherein: the method comprises determining the growth classification or score for the cell line by inputting at least the colony size information to the cell growth assessment algorithm, the colony size information including the pixel count derived from the down-sampled segmentation map, and the pixel count being a count of how many pixels in the down-sampled segmentation map were classified by the fully convolutional neural network as belonging to a cel colony; and the cell growth assessment algorithm determines the growth classification or score at least in part by comparing the pixel count to a threshold pixel count.

Example 7. The method of any one of examples 1 through 6, further comprising: based at least in part on the growth classification or score for the cell line, selectively using or not using the cel line in a subsequent stage of a cel line development process.

Example 8. The method of example 7, wherein selectively using the cell line the subsequent stage of the cell line development process comprises selectively advancing the cell line to a new culture environment, and/or wherein selectively not using the cel line in the subsequent stage of the cel line development process comprises not advancing the cel Ine to a new culture environment.

Example 9. The method of any one of examples 1 through 8, further comprising, prior to generating the down-sampled segmentation map: receiving a plurality of well training images; generating a plurality of image patches at least by cropping each image of the plurality of well training images to a smaller size; receiving a user-provided label for each of the plurality of image patches; and training the fully convolutional neural network using the plurality of image patches and the user-provided labels for the plurality of image patches.

Example 10. The method of example 9, wherein receiving the user-provided label for each of the plurality of image patches comprises receiving only a single user-provided label for each of the plurality of image patches.

Example 11. The method of any one of examples 1 through 10, further comprising using the display of the colony size information in a manual cell growth assessment.

Example 12. One or more non-transitory computer-readable media storing instructions that, when executed by one or more processors, cause the one or more processors to: receive a first well image of a well that contains a medium that was inoculated with at least one cell of a cel line; generate a down-sampled segmentation map comprising pixels that indicate an inferred presence or absence of a cell colony in corresponding portions of the first well image, wherein generating the down-sampled segmentation map comprises inputting the first well image to a fully convolutional neural network having a plurality of convolutional layers, and the down-sampled segmentation map has fewer pixels than the first well image; and one or both of (i)

determine, by inputting colony size information to a cel growth assessment algorithm, a growth classification or score for the cell line, wherein the colony size information includes the down-sampled segmentation map and/or a pixel count derived from the down-sampled segmentation map, and cause a display of the growth classification or score, and (ii) cause a display of the colony size information to facilitate a manual cell growth assessment.

Example 13. The one or more non-transitory computer-readable media of example 12, wherein the fully convolutional neural network comprises a plurality of convolutional layers and no transpose layers.

Example 14. The one or more non-transitory computer-readable media of example 12 or 13, wherein: the instructions cause the one or more processors to generate the first well image at a first time; and the instructions further cause the one or more processors to generate a second well image at a second time earlier than the first time, and determine, by processing the second well image, a count of at least a subset of cels present within the well at the second time.

Example 15. The one or more non-transitory computer-readable media of example 14, wherein: the instructions cause the one or more processors to cause the display of the colony size information; and the instructions further cause the one or more processors to cause a display of the count.

Example 16. The one or more non-transitory computer-readable media of example 14 or 15, wherein the instructions cause the one or more processors to: determine the growth classification or score for the cell Ine by inputting at least the colony size information and the count to the cell growth assessment algorithm; and cause the display of the growth classification or score.

Example 17. The one or more non-transitory computer-readable media of any one of examples 12 through 16, wherein: the instructions cause the one or more processors to determine the growth classification or score for the cell line by inputting at least the colony size information to the cell growth assessment algorithm, the colony size information including the pixel count derived from the down-sampled segmentation map, and the pixel count being a count of how many pixels in the down-sampled segmentation map were classified by the fully convolutional neural network as belonging to a cel colony; and the cel growth assessment algorithm determines the growth classification or score at least in part by comparing the pixel count to a threshold pixel count.

Example 18. A system comprising: a visual inspection system comprising a stage configured to accept a well plate, and an imaging unit configured to generate images of wells within the well plate on the stage; and a computer system including one or more processors, and one or more memories storing instructions that, when executed by the one or more processors, cause the computer system to command the imaging unit to generate a first well image of a well that contains a medium that was inoculated with at least one cell of the cell line, generate a down-sampled segmentation map comprising pixels that indicate an inferred presence or absence of a cell colony in corresponding portions of the first well image, wherein generating the down-sampled segmentation map comprises inputting the first well image to a fully convolutional neural network having a plurality of convolutional layers, and the down-sampled segmentation map has fewer pixels than the first well image, and one or both of (i) determine, by inputting colony size information to a cel growth assessment algorithm, a growth classification or score for the cel line, the colony size information including the down-sampled segmentation map and/or a pixel count derived from the down-sampled segmentation map, and display the growth classification or score, and (ii) display the colony size information to facilitate a manual cel growth assessment.

Example 19. The system of example 18, wherein the fully convolutional neural network has a plurality of convolutional layers and no transpose layers.

Example 20. The system of example 18 or 19, wherein: the instructions cause the computer system to command the imaging unit to generate the first well image at a first time; and the instructions further cause the computer system to command the imaging unit to generate a second well image at a second time earlier than the first time, and determine, by processing the second well image, a count of at least a subset of cels present within the well at the second time.

Example 21. The system of example 20, wherein: the instructions cause the computer system to display the colony size information; and the instructions further cause the computer system to display the count.

Example 22. The system of example 20 or 21, wherein the instructions cause the computer system to: determine the growth classification or score for the cell line by inputting at least the colony size information and the count to the cell growth assessment algorithm; and display the growth classification or score.

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the fling date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of facilitating a growth assessment for a cell line, the method comprising:
generating, by an imaging unit, a first well image of a well that contains a medium that was inoculated with at least one cell of the cell line;
generating, by one or more processors, a down-sampled segmentation map representing the entirety of the first well image and comprising pixels that indicate an inferred presence or absence of a cell colony in corresponding portions of the first well image, wherein
generating the down-sampled segmentation map comprises inputting the first well image to a fully convolutional neural network comprising a plurality of convolutional layers and no transpose layers, and
the down-sampled segmentation map has fewer pixels than the first well image; and
one or both of
(i) determining, by the one or more processors inputting colony size information to a cell growth assessment algorithm, a growth classification or score for the cell line, wherein the colony size information includes the down-sampled segmentation map and/or a pixel count derived from the down-sampled segmentation map, and causing, by the one or more processors, a display of the growth classification or score, and (ii) causing, by the one or more processors, a display of the colony size information to facilitate a manual cell growth assessment.

2. The method of claim 1, wherein:
generating the first well image comprises generating the first well image at a first time, and further comprises generating a second well image at a second time earlier than the first time; and
the method further comprises determining, by the one or more processors processing the second well image, a count of at least a subset of cells present within the well at the second time.

3. The method of claim 2, wherein:
the method comprises causing the display of the colony size information; and
the method further comprises causing, by the one or more processors, a display of the count.

4. The method of claim 2, wherein the method comprises:
determining the growth classification or score for the cell line by inputting at least the colony size information and the count to the cell growth assessment algorithm; and
causing the display of the growth classification or score.

5. The method of claim 1, wherein:
the method comprises determining the growth classification or score for the cell line by inputting at least the colony size information to the cell growth assessment algorithm, the colony size information including the pixel count derived from the down-sampled segmentation map, and the pixel count being a count of how many pixels in the down-sampled segmentation map were classified by the fully convolutional neural network as belonging to a cell colony; and
the cell growth assessment algorithm determines the growth classification or score at least in part by comparing the pixel count to a threshold pixel count.

6. The method of claim 1, further comprising:
based at least in part on the growth classification or score for the cell line, selectively using or not using the cell line in a subsequent stage of a cell line development process.

7. The method of claim 6, wherein selectively using the cell line in the subsequent stage of the cell line development process comprises selectively advancing the cell line to a new culture environment, and/or
wherein selectively not using the cell line in the subsequent stage of the cell line development process comprises not advancing the cell line to a new culture environment.

8. The method of claim 1, further comprising, prior to generating the down-sampled segmentation map:
receiving a plurality of well training images;
generating a plurality of image patches at least by cropping each image of the plurality of well training images to a smaller size;
receiving a user-provided label for each of the plurality of image patches; and
training the fully convolutional neural network using the plurality of image patches and the user-provided labels for the plurality of image patches.

9. The method of claim 8, wherein receiving the user-provided label for each of the plurality of image patches comprises receiving only a single user-provided label for each of the plurality of image patches.

10. The method of claim 1, further comprising using the display of the colony size information in a manual cell growth assessment.

11. One or more non-transitory computer-readable media storing instructions that, when executed by one or more processors, cause the one or more processors to:
receive a first well image of a well that contains a medium that was inoculated with at least one cell of a cell line;
generate a down-sampled segmentation map representing the entirety of the first well image and comprising pixels that indicate an inferred presence or absence of a cell colony in corresponding portions of the first well image, wherein
generating the down-sampled segmentation map comprises inputting the first well image to a fully convolutional neural network comprising a plurality of convolutional layers and no transpose layers, and
the down-sampled segmentation map has fewer pixels than the first well image; and
one or both of
(i) determine, by inputting colony size information to a cell growth assessment algorithm, a growth classification or score for the cell line, wherein the colony size information includes the down-sampled segmentation map and/or a pixel count derived from the down-sampled segmentation map, and cause a display of the growth classification or score, and
(ii) cause a display of the colony size information to facilitate a manual cell growth assessment.

12. The one or more non-transitory computer-readable media of claim 11, wherein:
the instructions cause the one or more processors to generate the first well image at a first time; and
the instructions further cause the one or more processors to
generate a second well image at a second time earlier than the first time, and
determine, by processing the second well image, a count of at least a subset of cells present within the well at the second time.

13. The one or more non-transitory computer-readable media of claim 12, wherein:
the instructions cause the one or more processors to cause the display of the colony size information; and
the instructions further cause the one or more processors to cause a display of the count.

14. The one or more non-transitory computer-readable media of claim 12, wherein the instructions cause the one or more processors to:
determine the growth classification or score for the cell line by inputting at least the colony size information and the count to the cell growth assessment algorithm; and
cause the display of the growth classification or score.

15. The one or more non-transitory computer-readable media of claim 11, wherein:
the instructions cause the one or more processors to determine the growth classification or score for the cell line by inputting at least the colony size information to the cell growth assessment algorithm, the colony size information including the pixel count derived from the down-sampled segmentation map, and the pixel count being a count of how many pixels in the down-sampled segmentation map were classified by the fully convolutional neural network as belonging to a cell colony; and the cell growth assessment algorithm determines the growth classification or score at least in part by comparing the pixel count to a threshold pixel count.

16. A system comprising:

a visual inspection system comprising
- a stage configured to accept a well plate, and
- an imaging unit configured to generate images of wells within the well plate on the stage; and a computer system including
- one or more processors, and
- one or more memories storing instructions that, when executed by the one or more processors, cause the computer system to
  - command the imaging unit to generate a first well image of a well that contains a medium that was inoculated with at least one cell of the cell line,
  - generate a down-sampled segmentation map representing the entirety of the first well image and comprising pixels that indicate an inferred presence or absence of a cell colony in corresponding portions of the first well image, wherein
    - generating the down-sampled segmentation map comprises inputting the first well image to a fully convolutional neural network comprising a plurality of convolutional layers and no transpose layers, and
    - the down-sampled segmentation map has fewer pixels than the first well image, and
  - one or both of
    - (i) determine, by inputting colony size information to a cell growth assessment algorithm, a growth classification or score for the cell line, the colony size information including the down-sampled segmentation map and/or a pixel count derived from the down-sampled segmentation map, and display the growth classification or score, and
    - (ii) display the colony size information to facilitate a manual cell growth assessment.

17. The system of claim 16, wherein:

the instructions cause the computer system to command the imaging unit to generate the first well image at a first time; and the instructions further cause the computer system to
- command the imaging unit to generate a second well image at a second time earlier than the first time, and
- determine, by processing the second well image, a count of at least a subset of cells present within the well at the second time.

18. The system of claim 17, wherein:

the instructions cause the computer system to display the colony size information; and the instructions further cause the computer system to display the count.

19. The system of claim 17, wherein the instructions cause the computer system to:

determine the growth classification or score for the cell line by inputting at least the colony size information and the count to the cell growth assessment algorithm; and display the growth classification or score.

* * * * *